(12) United States Patent
Saini et al.

(10) Patent No.: US 8,545,935 B2
(45) Date of Patent: *Oct. 1, 2013

(54) ON-THE-FLY COATING OF ACID-RELEASING DEGRADABLE MATERIAL ONTO A PARTICULATE

(75) Inventors: Rajesh K. Saini, Cypress, TX (US); Bradley L. Todd, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,400

(22) Filed: Mar. 30, 2012

(65) Prior Publication Data

US 2012/0189771 A1    Jul. 26, 2012

Related U.S. Application Data

(60) Division of application No. 10/736,339, filed on Dec. 15, 2003, which is a continuation-in-part of application No. 10/641,242, filed on Aug. 14, 2003, now Pat. No. 7,080,688.

(51) Int. Cl.
*B05D 7/00* (2006.01)

(52) U.S. Cl.
USPC .......................................................... 427/212

(58) Field of Classification Search
USPC .......................................................... 427/212
See application file for complete search history.

(56) References Cited

U.S. PATENT DOCUMENTS 4,124,685 A * 11/1978 Tarhan et al. ............. 423/574.2
4,257,955 A *  3/1981 Gansow et al. ............... 540/465

* cited by examiner

*Primary Examiner* — Elena T Lightfoot
(74) *Attorney, Agent, or Firm* — Robert A. Kent; McDermott Will & Emery LLP

(57) ABSTRACT

Methods of creating particulates coated with acid-releasing degradable material comprising the steps of: combining an acid-releasing degradable material with a solvent or a plasticizer to create a coating solution; providing a first flowing stream comprising the coating solution; providing a second flowing stream comprising particulates; and, combining the first and second flowing streams to create a third flowing stream comprising particulates coated with the coating solution. Wherein the acid-releasing degradable material comprises at least one acid-releasing degradable material selected from the group consisting of: poly(orthoester); a lactide, a poly(lactide); a glycolide; a poly(glycolide); a poly($\epsilon$-caprolactone); a poly(hydroxybutyrate); a substantially water insoluble anhydride; a poly(anhydride); a poly(amino acid); a copolymer of two or more of the above-listed compounds; and any combination thereof.

9 Claims, No Drawings

ON-THE-FLY COATING OF ACID-RELEASING DEGRADABLE MATERIAL ONTO A PARTICULATE

CROSS-REFERENCE TO RELATED APPLICATIONS

This application is a divisional of U.S. application Ser. No. 10/736,339, which was filed on Dec. 15, 2003 and published as 2005-0034861 which was itself a continuation-in-part of U.S. application Ser. No. 10/641,242, which was filed on Aug. 14, 2003 and issued as U.S. Pat. No. 7,080,688.

BACKGROUND OF THE INVENTION

The present invention relates to methods and compositions for treating subterranean formations, and more specifically, to improved methods and compositions for degrading filter cake deposited in a subterranean formation.

Filter cake, the residue deposited on a permeable medium when servicing fluids contact the medium under a pressure, is formed in a variety of subterranean operations such as drilling, fracturing, and gravel packing. A filter cake is often desirable, at least temporarily, in subterranean operations as it may act to stem the flow of a servicing fluid from its desired location, to the surrounding subterranean formation. For instance, where the servicing fluid is a drilling fluid, a filter cake formed on the wall of the well bore may act to keep the drilling fluid in its desired location, in the annulus between the well bore and the drill pipe, rather than allowing the drilling fluid to leach off into the surrounding formation. Loss of drilling, fracturing, gravel transport and other servicing fluids into the formation represents an increased expense and, if too much fluid is lost, the attendant increase in damage to the producing zones in the formation. Moreover, the presence of a filter cake may add strength and stability to the formation surfaces on which the filter cake forms, as in the case of soft sandstone formations.

Filter cakes may be formed during drilling and fracturing operations. Once a well bore is established, the producing zones along the well bore may be treated to increase their production rate. One such production stimulation treatment involves hydraulically fracturing the formation with a viscous treating fluid to create one or more cracks or "fractures." As a fracture is created, a portion of the fluid contained in the viscous fracturing fluid leaks off into the formation and creates a filter cake comprising deposited viscosifying agent and fluid loss control agent on the walls of the fracture and the formation. The filter cake acts as a physical barrier to liquid travel that, as described above, helps reduce fluid loss into the producing zone. The filter cake may also present a barrier to flow of liquid from the zone, thus, after the fracturing operation has been completed, the filter cake generally needs to be removed to maximize oil and/or gas production.

Sand control operations, such as gravel packing, are also common after a well bore is drilled. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Often, gravel packs are placed along a well bore having a filter cake on its walls.

While filter cakes may be beneficial, it is generally necessary to remove filter cakes from producing zones before the well is placed onto production. One known method for the removal of filter cakes from producing formations involves including an acid-soluble particulate solid bridging agent for bridging over the formation pores in the drilling, fracturing, gravel transport or other servicing fluid that forms the filter cake. Such an acid-soluble filter cake could then be removed by placing a strongly acidic acid solution in contact with the filter cake and allowing that solution to remain in contact for a period of time sufficient to dissolve the filter cake.

One consideration in removing a deposited filter cake from a subterranean well bore formation involves the timing of such removal. For instance, in situations where sand control of the formation is a concern, a filter cake offers some degree of control over unconsolidated particulates in the subterranean formation while placing the gravel pack. For example, if the filter cake is removed prior to gravel packing, the unconsolidated particulates are not controlled and well bore stability problems may arise causing the collapse of the bore hole and preventing the installation of a gravel pack. While installing the screen and placing the gravel before removing the filter cake helps control unconsolidated particulates and maintain bore hole stability, it also makes the filter cake itself more difficult to remove. This is because the screen and gravel represents a physical barrier between the filter cake on walls of the well bore and the acidic fluid used to remove the filer cake.

One conventional method that attempts to overcome that problem involves placing a breaker (e.g., an oxidizer, ester, enzyme, or the like) in the fracturing, transport or other servicing fluid that creates and/or treats the filter cake in hopes that the breaker will permeate the filter cake and break it down. However, because the breaker is dissolved in the servicing fluid and not all of the servicing fluid remains in the subterranean formation inter alia, while circulating a gravel pack, much of the breaker that is used gets circulated out of the well bore and does not interact with the filter cake as desired.

More recently, it has been found that acid-releasing degradable material may be coated onto a particulate and act at a delayed rate to produce acid such that the particulate may be placed in the subterranean formation adjacent to the filter cake before a substantial amount of acid is released. In such methods known in the art, the acid-releasing degradable material had to be coated onto the particulate in a controlled environment off-site from the well head. The material then had to be coated onto various types and sizes of gravel/proppant, stored, and transported before it could be used in a subterranean formation.

SUMMARY OF THE INVENTION

The present invention relates to methods and compositions for treating subterranean formations, and more specifically, to improved methods and compositions for degrading filter cake deposited on a subterranean formation.

One embodiment of the present invention provides a method of creating particulates coated with acid-releasing degradable material on-the-fly comprising the step of: combining an acid-releasing degradable material with a solvent or a plasticizer to create a coating solution; and, coating the coating solution onto a particulate on-the-fly to create coated particulates.

Another embodiment of the present invention provides a method of degrading filter cake in a subterranean formation comprising the steps of: combining an acid-releasing degradable material with a solvent or a plasticizer to create a coating solution; coating the coating solution onto a particulate on-the-fly to create coated particulates; placing the coated particulates into a subterranean formation so that they form a pack substantially adjacent to a filter cake; allowing the low molecular weight acid-releasing degradable material to produce acid; and allowing the acid to contact and degrade a portion of the filter cake.

Still another embodiment of the present invention provides a gravel pack comprising gravel particles coated on-the-fly with an acid-releasing degradable material.

The objects, features, and advantages of the present invention will be readily apparent to those skilled in the art upon a reading of the description of the preferred embodiments that follows.

DESCRIPTION OF PREFERRED EMBODIMENTS

The present invention relates to methods and compositions for treating subterranean formations, and more specifically, to improved methods and compositions for degrading filter cake deposited on a subterranean formation.

Certain embodiments of the compositions of the present invention comprise particulates coated on-the-fly with an acid-releasing degradable material that releases acid over time. The released acid may be used to degrade an acid-degradable filter cake substantially adjacent to the coated particulates. In some embodiments the acid-releasing degradable material used to coat the particulates acts at a delayed rate to produce acid such that the particles may be placed in the subterranean formation adjacent to the filter cake before a substantial amount of acid is released. The compositions and methods of the present invention are suitable for use in removing any filter cake that degrades in the presence of an acid.

Any particulate material suitable for use in conjunction with subterranean applications is suitable for use as the particulate in the compositions and methods of the present invention. Natural sand, quartz sand, particulate garnet, glass, ground walnut hulls, nylon pellets, bauxite, ceramics, polymeric materials, or the like are all suitable. Suitable sizes range from 4 to 100 U.S. mesh, in certain preferred embodiments the sizes range from 10 to 70 US mesh. The particulate material of the present invention may be used as gravel particles used in sand control operations, as proppant particles used in fracturing operations, or as any other particulate employed in subterranean operations that may be placed substantially adjacent to a filter cake.

Acid-releasing degradable materials that may be used in conjunction with the present invention are those materials that can be coated onto a particulate on-the-fly and that are substantially water insoluble such that they degrade over time, rather than instantaneously, to produce an acid.

Moreover, in order for an acid-releasing degradable material to be suitable for on-the-fly coating onto a particulate, it must be in a substantially liquid, flowable form. Solvents can be used for this purpose. Such suitable solvents include, but are not limited to, acetone, propylene carbonate, di(propylene glycol) methyl ether, di(propylene glycol) propyl ether, di(propylene glycol) butyl ether, di(propylene glycol) methyl ether acetate, isopropyl alcohol, chloroform, dichloromethane, trichloromethane, 1,2-dichlorobenzene, tetrahydrofuran, benzene, acetonitrile, dioxane, dimethylformamide, toluene, ethyl acetate, isoamyl alcohol, N-methylpyrrolidone, xylenes, dichloroacetic acid, m-cresol, hexafluoroisopropanol, diphenyl ether, acetonitrile, methanol, ethyl benzene, naphthalene, naphtha and combinations thereof As an alternative to a solvent, a plasticizer also may be used to make the polymer more flowable for the coating process. Examples of plasticizers useful for this purpose include, but are not limited to, polyethylene glycol; polyethylene oxide; oligomeric lactic acid; citrate esters (such as tributyl citrate oligomers, triethyl citrate, acetyltributyl citrate, acetyltriethyl citrate, 25% by weight after the phase separate); glucose monoesters; partially fatty acid esters; PEG monolaurate; triacetin; poly(e-caprolactone); poly(hydroxybutyrate); glycerin-1-benzoate-2,3-dilaurate; glycerin-2-benzoate-1,3-dilaurate; starch; bis(butyl diethylene glycol) adipate; ethylphthalylethyl glycolate; glycerine diacetate monocaprylate; diacetyl monoacyl glycerol; polypropylene glycol (and epoxy derivatives thereof); poly(propylene glycol)dibenzoate, dipropylene glycol dibenzoate; glycerol; ethyl phthalyl ethyl glycolate; poly(ethylene adipate)disterate; di-iso-butyl adipate; and combinations thereof Generally, suitable acid-releasing degradable materials include polyesters; poly(orthoesters); aliphatic polyesters; lactides, poly(lactides); glycolides; poly(glycolides); poly($\epsilon$-caprolactone); poly(hydroxybutyrate); substantially water insoluble anhydrides; poly(anhydrides); poly(amino acids); and mixtures and copolymers of the same. The acid-releasing degradable material chosen must be substantially soluble in the chosen solvent. While no particular molecular weight is required, lower molecular weight materials may be more easily soluble. By way of example, polylactides having a molecular weight of less than about 3,000 are generally soluble in propylene carbonate while polylactides having a molecular weight of 50,000 generally are not. Copolymerization may also be used to facilitate solubility in a suitable solvent. By way of example, copolymers of lactide and glycolide will be soluble in di(proplylene glycol) methyl ether at molecular weights where a polylacide material of the same molecular weight would not be soluble. Amorphous polymers are generally more soluble in solvents and this property can be considered in choosing a material for coating. It is within the ability of one skilled in the art, with the benefit of this disclosure, to select an acid-releasing degradable material suitable for use in the present invention.

Polymers suitable for use as an acid-releasing degradable material of the present invention may be considered degradable if the degradation is due, inter alia, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Blends of certain acid-releasing degradable materials may also be suitable. One example of a suitable blend of materials includes a blend of a poly(lactic acid) and lactide. Other materials that undergo degradation and produce acid may also be suitable, if the products of the degradation do not undesirably interfere with either the subterranean treatment being performed or the subterranean formation.

In choosing the appropriate acid-releasing degradable material, one should consider the degradation products that will result. Also, these degradation products should not adversely affect other operations or components. The conditions of the well, e.g., well bore temperature and environmental factors, must also be considered when choosing an acid-releasing degradable material. For instance, polyesters have been found to be suitable for well bore temperatures in the range of 60° F. to 400° F. Generally, smaller molecule acid-releasing degradable materials are suitable for use in lower temperature application and larger molecule acid-releasing degradable materials are suitable for use in higher-temperature applications. By way of example, lactide is suitable for temperatures below 120 F and 3,000 molecular weight polylactide for temperatures above 180 F. Copolymers of lactide and glycolide are suitable for use in the 120 F to 180 F. It is within the ability of one skilled in the art, with the benefit of this disclosure, to select a suitable acid-releasing degradable material.

When used in the present invention, a preferable result is achieved if the degradable material degrades slowly over time as opposed to instantaneously. Even more preferable results have been obtained when the degradable material does not substantially degrade until after the subterranean treatment, such as a gravel packing or fracturing operation, has been substantially completed.

The acid-releasing degradable material of the present invention may be coated onto particulate material by any means known in the art. In one embodiment, the particles may be coated with the acid-releasing degradable material "on-the-fly." The term "on-the-fly" is used herein to mean that one flowing stream is continuously introduced into another flowing stream so that the streams are combined and mixed while continuing to flow as a single stream as part of the on-going treatment at the job site. Such mixing can also be described as "real-time" mixing. One such on-the-fly mixing method would involve continuously conveying the particles and the acid-releasing degradable material to a mixing vessel. Once inside the mixing vessel, the particles would be coated with the acid-releasing degradable material and continuously removed from the mixing vessel. In that situation, a sand screw could be used both to aid in mixing the particulates, be they gravel, proppant, or some other particulate, with the acid-releasing degradable material and to remove the acid-releasing degradable material-coated particles from the mixing tank. As is well understood by those skilled in the art, batch or partial batch mixing may also be used to accomplish such coating.

In some embodiments of the present invention the particle material, such as gravel in a gravel packing operation or proppant in a fracturing operation, is coated with from about 0.1% to about 20% acid-releasing degradable material by weight of the gravel particles, more preferably from about 0.5% to about 10% acid-releasing degradable material by weight of the gravel particles and most preferably from about 1% to about 8% acid-releasing degradable material by weight of the particulate material. In some embodiments of the present invention, all of the particles used in the subterranean operation are coated with an acid-releasing degradable material of the present invention. In other embodiments, only a portion of the particles is coated. Where the percentage of particles coated is less than 100%, it may be desirable to coat a higher percentage of the acid-releasing degradable material on the coated particles. It is within the ability of one skilled in the art to determine the amount of acid-releasing degradable material that will be necessary to sufficiently degrade the filter cake and to coat enough particles with enough acid-releasing degradable material to achieve that goal.

Where the coated particles of the present invention are used in a sand control operation such as gravel packing, the gravel pack may be formed using any technique known in the art. In one technique, gravel particles at least partially coated with an acid-releasing material are slurried into a delivery fluid and pumped into the well bore having a filter cake deposited thereon and substantially adjacent to the zone of the subterranean formation that has been fitted with a gravel pack screen. The gravel material is separated from the slurry as the delivery fluid is forced into the well bore and through the screen. The gravel particles are not able to flow through the mesh of the screen and are left behind, thus forming a gravel pack. In a gravel pack formed from such coated particles, the acid-releasing degradable material substantially degrades the adjacent filter cake.

Similarly, where the coated particles of the present invention are used in a fracturing operation, the proppant pack formed inside the fracture with the coated particles of the present invention may be formed using any technique known in the art. In one technique, proppant particles at least partially coated with an acid-releasing material are slurried into a fracturing fluid and pumped into a fractured subterranean formation. The proppant particles are then placed in the fracture and form a proppant pact substantially adjacent to walls of the fracture. Once the proppant pack is substantially formed, the acid-releasing degradable material produces a sufficient amount of acid at least to partially degrade the filter cake on the walls of the fracture.

To facilitate a better understanding of the present invention, the following example of a preferred embodiment is given. In no way should the following example be read to limit the scope of the invention.

EXAMPLE

A 6100 molecular weight copolymer of 50% lactic acid and 50% glycolic acid was synthesized. The copolymer was then dissolved in propylene carbonate to a 50/50% concentration of polymer to solvent. The polymer/solvent was coated onto 20/40 Carbolite® proppant at a 4% concentration by weight of the proppant. A filter cake was deposited on a 35 micron Aloxite core in a Fann HPHT Filtration Cell from a drill-in fluid formulated using a 10% sodium chloride base fluid with 0.2% xanthan, 1.9% starch, 6.7% 5 micron median diameter calcium carbonate, 16.7% 25 micron median diameter calcium carbonate 0.025% sodium hydroxide. Once the filter cake was formed, with 500 psi differential pressure at 150 F for 60 minutes, the excess drill-in fluid was removed from the test chamber and replaced with 141 grams of the coated proppant and 64 mL of 10% sodium chloride solution. The cell was heated to 160 F with 50 psi differential pressure and the filtrate rate was monitored. The filtrate rate averaged around 2 mL/hr for the first 9 hours indicating the filter cake was still intact. At around 9 hours, the filtrate rate began to increase and was around 300 mL/hr within about 5 minutes of the point of the increase. The increase flow rate is an indication of filter cake degradation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of creating particulates coated with acid-releasing degradable material comprising the steps of:
combining an acid-releasing degradable material with a solvent or a plasticizer to create a coating solution, wherein the acid-releasing degradable material comprises at least one acid-releasing degradable material selected from the group consisting of: poly(orthoester); a lactide, a poly(lactide); a glycolide; a poly(glycolide); a poly(ε-caprolactone); a poly(hydroxybutyrate); a substantially water insoluble anhydride; a poly(anhydride); a poly(amino acid); a copolymer of two or more of the above-listed compounds; and any combination thereof;
providing a first flowing stream comprising the coating solution;
providing a second flowing stream comprising particulates;
combining the first and second flowing streams to create a third flowing stream comprising particulates coated with the coating solution wherein the particulates are coated with from about 2% to about 20% acid-releasing degradable material by weight of the particulates.

2. The method of claim 1 wherein acid-releasing degradable material comprises a material that degrades over time in an aqueous environment.

3. The method of claim 1 wherein the solvent comprises at least one solvent selected from the group consisting of: acetone; propylene carbonate; di(propylene glycol) methyl ether; di(propylene glycol) propyl ether; di(propylene glycol) butyl ether; di(propylene glycol) methyl ether acetate; isopropyl alcohol; chloroform; dichloromethane; trichloromethane; 1,2-dichlorobenzene; tetrahydrofuran; benzene; acetonitrile; dioxane; dimethylformamide; toluene; ethyl acetate; isoamyl alcohol; N-methylpyrrolidone; xylene; dichloroacetic acid; m-cresol; hexafluoroisopropanol; diphenyl ether; acetonitrile; methanol; ethyl benzene; naphthalene; naphtha; and any combination thereof.

4. The method of claim 1 wherein the plasticizer comprises at least one plasticizer selected from the group consisting of: polyethylene glycol; polyethylene oxide; oligomeric lactic acid; a citrate ester; a glucose monoester; a partially esterified fatty acid ester; PEG monolaurate; triacetin; poly(ε-caprolactone); poly(hydroxybutyrate); glycerin-1-benzoate-2,3-dilaurate; glycerin-2-benzoate-1,3-dilaurate; a starch; bis(butyl diethylene glycol)adipate; ethylphthalylethyl glycolate; glycerine diacetate monocaprylate; diacetyl monoacyl glycerol; polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and any combination thereof.

5. The method of claim 1 wherein the acid-releasing degradable material is a poly(orthoester).

6. A method of creating particulates coated with acid-releasing degradable material comprising the steps of:
combining a poly(orthoester) with a solvent or a plasticizer to create a coating solution;
providing a first flowing stream comprising the coating solution;
providing a second flowing stream comprising particulates;
combining the first and second flowing streams to create a third flowing stream comprising particulates coated with the coating solution wherein the particulates are coated with from about 2% to about 20% acid-releasing degradable material by weight of the particulates.

7. The method of claim 6 wherein the solvent comprises at least one solvent selected from the group consisting of: acetone; propylene carbonate; di(propylene glycol) methyl ether; di(propylene glycol) propyl ether; di(propylene glycol) butyl ether; di(propylene glycol) methyl ether acetate; isopropyl alcohol; chloroform; dichloromethane; trichloromethane; 1,2-dichlorobenzene; tetrahydrofuran; benzene; acetonitrile; dioxane; dimethylformamide; toluene; ethyl acetate; isoamyl alcohol; N-methylpyrrolidone; xylene; dichloroacetic acid; m-cresol; hexafluoroisopropanol; diphenyl ether; acetonitrile; methanol; ethyl benzene; naphthalene; naphtha; and any combination thereof.

8. The method of claim 6 wherein the plasticizer comprises at least one plasticizer selected from the group consisting of: polyethylene glycol; polyethylene oxide; oligomeric lactic acid; a citrate ester; a glucose monoester; a partially esterified fatty acid ester; PEG monolaurate; triacetin; poly(ε-caprolactone); poly(hydroxybutyrate); glycerin-1-benzoate-2,3-dilaurate; glycerin-2-benzoate-1,3-dilaurate; a starch; bis(butyl diethylene glycol)adipate; ethylphthalylethyl glycolate; glycerine diacetate monocaprylate; diacetyl monoacyl glycerol; polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and any combination thereof.

9. A method of creating particulates coated with acid-releasing degradable material comprising the steps of:
combining a poly(orthoester) with propylene carbonate to create a coating solution;
providing a first flowing stream comprising the coating solution;
providing a second flowing stream comprising particulates;
combining the first and second flowing streams to create a third flowing stream comprising particulates coated with the coating solution wherein the particulates are coated with from about 2% to about 20% acid-releasing degradable material by weight of the particulates.

* * * * *